Figure 1:
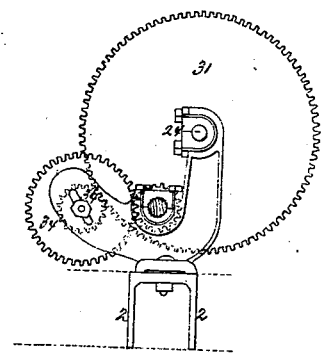

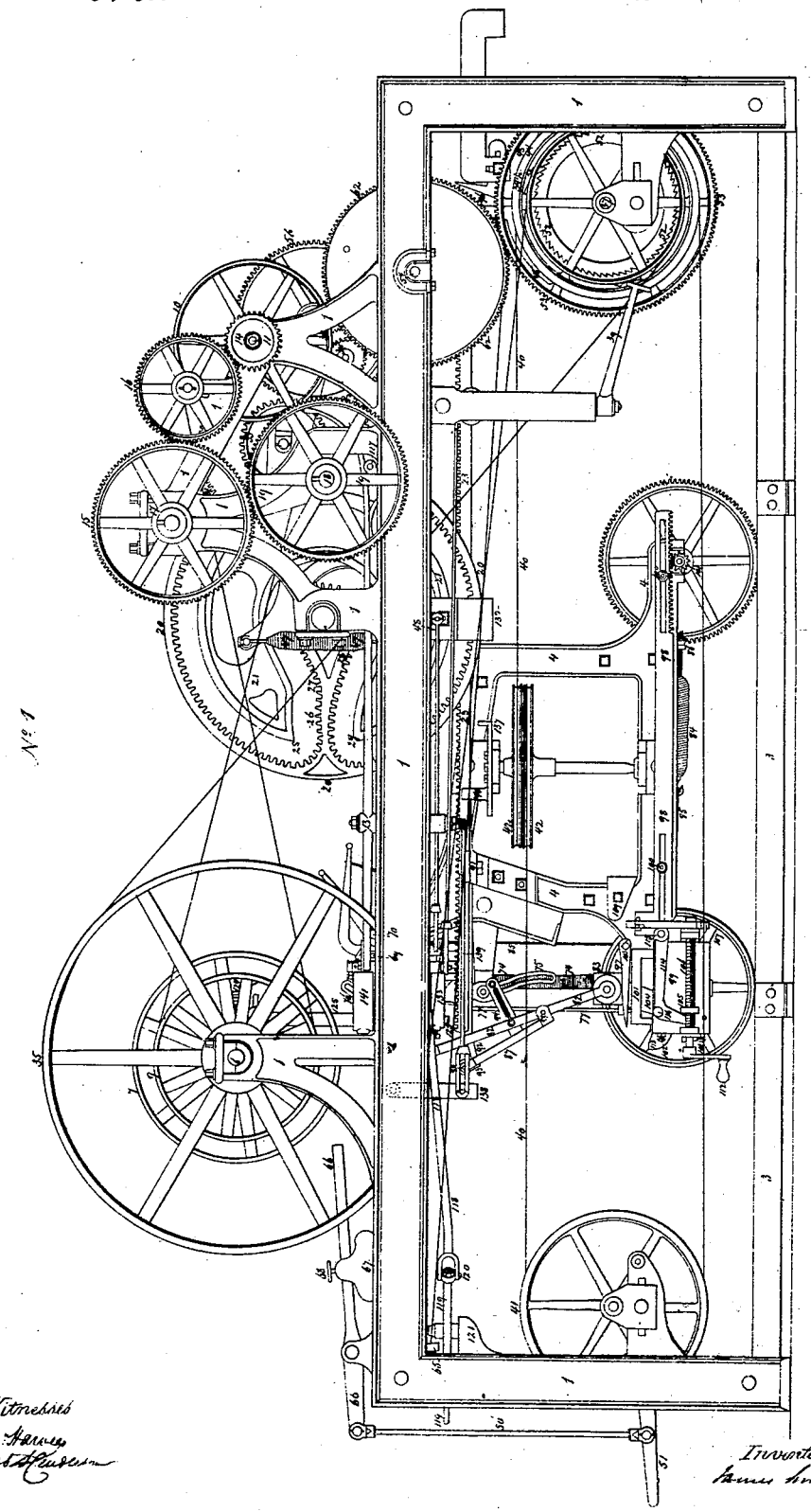

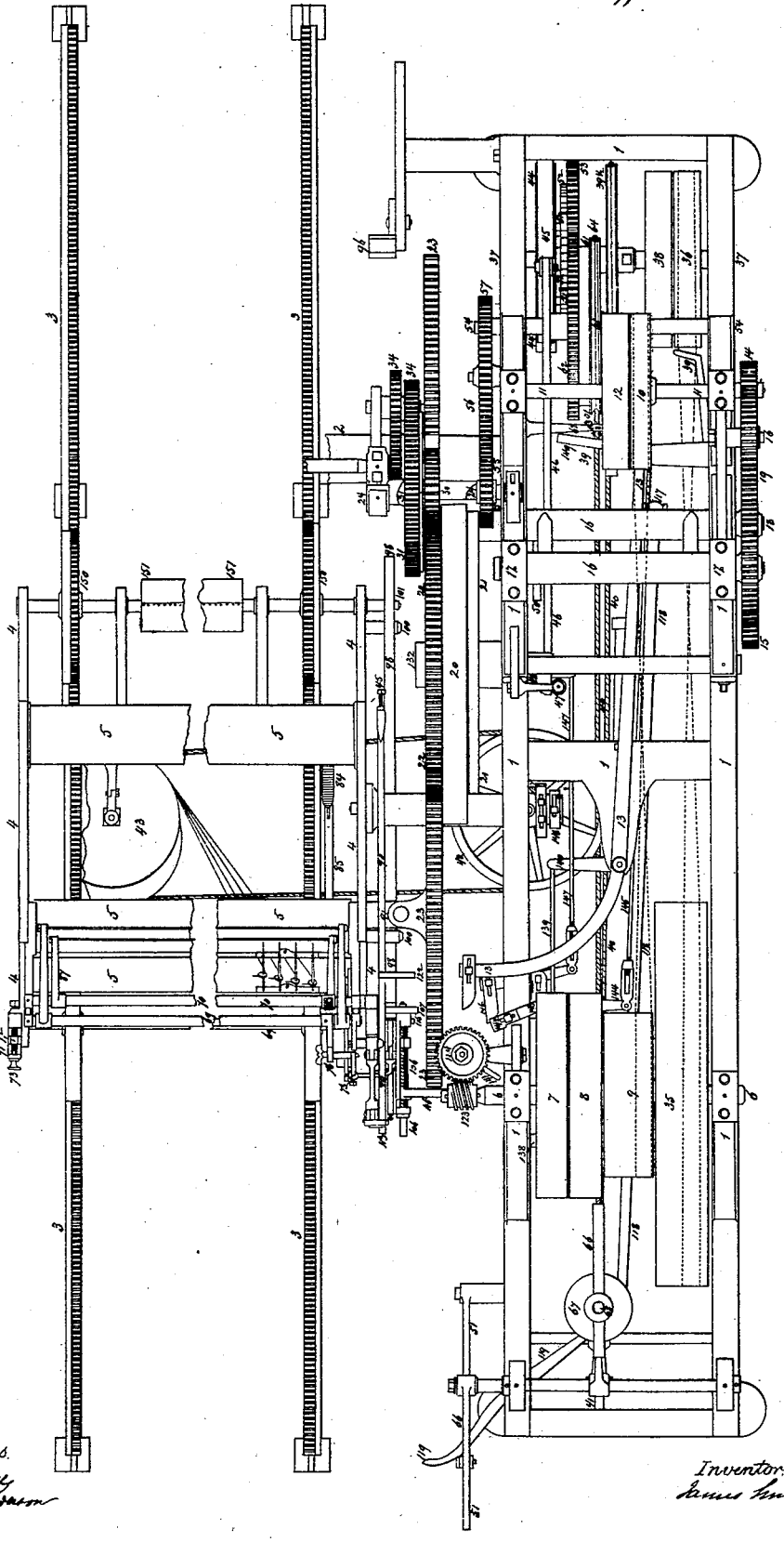

Sheet 3, 4 Sheets.

J. Smith.
Spinning Mule.

No 808. Patented Jun. 27, 1838.

Witnesses
M. Harris
Rob Henderson

Inventor
James Smith

J. Smith.
Spinning Mule.

Nº 808.  Patented Jun. 27, 1838.

Sheet 4, 4 Sheets.

Witnesses.
Inventor
James Smith

UNITED STATES PATENT OFFICE.

JAMES SMITH, OF THE COUNTY OF PERTH, SCOTLAND.

IMPROVEMENT IN SELF-ACTING MULES FOR SPINNING COTTON AND OTHER FIBROUS MATERIALS.

Specification forming part of Letters Patent No. 808, dated June 27, 1838.

*To all whom it may concern:*

Be it known that I, JAMES SMITH, of the county of Perth, in that part of the Kingdom of Great Britain called Scotland, have invented certain Improvements in Self-Acting Mules for Spinning Cotton and other Fibrous Materials; and I do hereby declare that the same consist in the following arrangement, as hereinafter described, with reference to the various drawings illustrative of the several parts, and the model of the said invention which is herewith presented.

In order that my said improvements may be more easily understood, I shall describe the ordinary and necessary movements of the machine known in the cotton trade by the name of the "mule-jenny," and to render which self-acting is the object of my said invention.

The mule-jenny consists of two distinct parts—viz., first, the beam with rollers which serve to draw out the rovings to the grist of thread required; second, the carriage upon which the spindles are mounted for the purpose of giving twist to the thread as it is slubbed out from the rollers, and upon the stem of which spindles the thread which has been spun is wound in successive stretches into a mass forming what is called a "cop." The beam is a stationary frame running the whole length of the mule, and upon which the rollers are placed in bearings fitted on to receive them. The carriage upon which the spindles are mounted rests upon two or more pairs of wheels, which are fitted to roll upon iron races placed upon the floor, and having their surface either in a straight and level line or of a curved or undulating line, as may be found most suitable. The principal movements are communicated to the rollers and carriage from mechanism mounted upon a frame-work placed across the mule, either at one end or in the center, as may best suit, and which frame-work, with the apparatus mounted thereon, is called the "head-stock."

When the mule is put in motion to perform the operation of spinning, the rollers are moved by wheel-works from the head-stock, and the carriage is gradually moved outward, keeping pace with the delivery of the rollers, and while the process is going on the spindles are put into a rapid motion by belts and bands proceeding from the fly-wheel of the head-stock, and which can be adjusted to give such an amount of twist as may be necessary. The whole of the twist may be thrown in during the outcoming of the carriage, as is generally done in spinning wefts or as in twist-spinning, when part is thrown in during the slubbing and the remainder after the carriage has reached its limit and the rollers have stopped. In the outward movement of the carriage the mule is driven by power communicated from the main gear to the fly-wheel shaft of the head-stock by a strap with a fast pulley, and when the stretch or draw has been completed the machine is entirely stopped by the belt being thrown on the loose pulley adjoining. The spinner then lays hold of the fly-wheel with one hand and turns it back so far as to throw off all the coils from the stems of the spindles, and which is technically called "backing off," while with the other hand he puts down the faller or guide to the proper position for winding the threads on the cops. He then pushes the carriage toward the beam, directing the faller with one hand so as to guide the threads in proper form on the cop, while with the other hand he turns forward the fly-wheel with such force as to cause the threads to be wound upon the cops with a uniform and proper tension. When the carriage has arrived at the beam, he lifts up the faller-wire so as to throw the threads in coils from the cops to the points of the spindles, thereby completing the draw or "stretch," as it is called, and leaving the whole in proper order to commence a new draw. The driving-belt is then drawn on the fast pulley, whereby the machine is again put in motion, and so goes on successively.

Having thus described the mode of operating with the common mule, I shall proceed to describe the method by which the labor and skill of the spinner are fully substituted and entirely dispensed with, and for the sake of illustration shall make reference to drawings contained in three separate sheets, and numbered 1, 2, and 3, No. 1 exhibiting a view of the head-stock in elevation, together with an end view of the carriage, No. 2 exhibiting a bird's-eye view of the head-stock, and part of the carriage, race-rods, &c., No. 3 containing views a part of the several pieces of mechanism which require more minute and detalied description.

Reference is made to these drawings by numbers, and the same numbers refer to the same parts of the machine as exhibited in all the drawings.

The whole of the parts are drawn to a scale which is given at the bottom of each drawing, and which is pretty nearly equal to the proportion of three inches to a foot.

In drawings Nos. 1 and 2 the different parts of the head-stock are colored gray, while those of the carriage and race-rods are colored blue, the wood-work of the carriage being colored yellow.

In describing the machine I shall first refer to the details of the mechanism, tracing each series from the driving-shaft, and having described all the parts, with their uses, I shall then trace their combined movements during the operation of the machine in completing a stretch or draw, and such parts as have movements bearing reference to the formation of the cop during its progress shall be described throughout.

Figure 5:
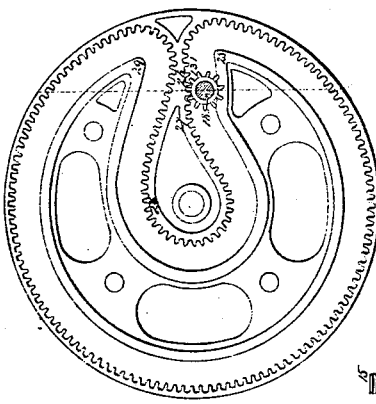

1 is the frame-work of the head-stock; 2, the beam upon which the rollers are mounted; 3, the race-rods upon which the carriage runs; 4, the frame-work of the ends of the carriage; 5, the wooden rails of the carriage; 6, the driving-shaft, to which motion is communicated from the great gearing by straps or by wheel-work in the usual modes. In this it is shown to be driven by a strap working on the fast pulley 7, and having beside it a loose pulley, 8, upon which the strap can be thrown when the machine is to be entirely stopped. 9 is a pulley fast upon the driving-shaft, and from which a strap proceeds to the pulley 10, fast upon the change-shaft 11, and having a corresponding loose pulley, 12; 13, a lever which guides the strap upon the pulleys 10 and 12. On the end of the change shaft 11 there is a pinion, 14, made fast by a nut, which can be easily removed when it is necessary to put on a larger or smaller pinion for the purpose of altering the relative movements of the rollers and spindles to suit different grists of yarn. This pinion communicates motion to the stud-wheel 15 through the intermediate wheel 16, the stud of which, being movable in a slit concentric to the wheel 15, can be adjusted to any size of pinion that may be put upon the change shaft 11. The axis of the stud-wheel 15 passes through the upper socket of a swinging frame, 16, which hangs on bearings in the frame-work at 17. Through the lower socket of the swinging frame there passes the pinion-shaft 18, to which motion is communicated from the stud-wheel 15 through the wheel 19. In the opposite end of this shaft there is a pinion of eight, ten, or more leaves, which works into the teeth of the regulating-wheel 20, and which is kept to a proper depth of gear by a friction-pulley on the collar of the shaft 18, which rolls on the surface of the guard 21, which is firmly attached by studs to the regulating-wheel or "mangle-wheel," as it is sometimes called, from its resemblance to the patent mangle-wheel. This wheel is of a peculiar form, which will be clearly seen on reference to Fig. 5, Drawing 3. It serves to give movement to the rollers, and also to the carriage in its movements, both outward and inward, while at the same time it performs other necessary movements and regulates in a great measure the successive progress of the general movements of the machine. Attached to the outside of the regulating-wheel 20 is a large spur-wheel, 22, which communicates motion to the carriage by gearing into the rack 23 and to the rollers through a series of wheels through the roller-shaft 24. On reference to Drawing No. 1, and to Fig. 5, Drawing 3, it will be seen that this wheel has a series of teeth, which may either be external or internal, (in this case they are internal,) which extend nearly round in a concentric circle near the periphery of the wheel, and while the pinion operates in this series of teeth the rollers and carriage are moved together with a slow and uniform motion. When the pinion has arrived to a position at 25, it turns round the point of the guard and proceeds in a radial line toward the center along the series of teeth at 26. While moving in this direction, it is obvious that the regulating-wheel will remain stationary, while the swinging frame 16, in which the pinion-shaft 18 is hung, will be forced to perform a vibration toward the center of the regulating-wheel, and during that vibration it performs the operation of stripping or backing off the coils of thread from the stems of the spindles, as shall hereinafter be described. When the pinion has arrived at the point 27, it begins to take into the teeth projecting externally from a curved line passing round the center of the regulating-wheel, and consequently commences to move the wheel in a direction opposite to that in which it moved while it wrought in the internal teeth of the outer series. The pitch-line of this inner series of teeth being at first considerably eccentric, the movement in rotation of the regulating-wheel is comparatively slow, which gives an easy start to the carriage; but as the pinion proceeds the pitch-line becomes more concentric, and being at a small distance from the center, the regulating-wheel is gradually forced into a rapid motion, which accelerates proportionally the inward movement of the carriage. The pitch-line at this part may either be for some continuance concentric to the regulating-wheel, or it may gradually approach to the nearest point about the middle of the series and again begin to recede in a uniform curve. When it has reached a point about 28, the progress of the pitch-line becomes rapidly eccentric, going nearly into the path of a radial line. By these means the movement of the regulating-wheel, and consequently the movement of the carriage, is gradually slowed, so that when it has arrived at its utmost limit in approaching the beam it comes to a state of rest without any shock, and the pinion, turning round the point of the guard at 29, passes gradually and softly into the outer series of teeth, reversing the movement of the regulating-wheel, and again producing the outward movement of the carriage. During this latter movement it is obvious that the swinging frame will have been forced to perform a reverse vibration until it has reached its original position.

Figure 2:
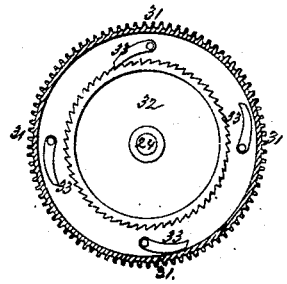
Figure 10:
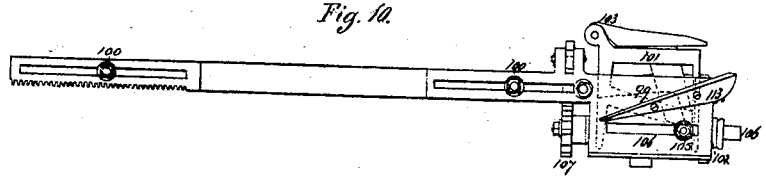

From the large spur-wheel 22 motion is communicated to the rollers through the wheel 30, which is fast upon the roller-shaft 24. At one end of this shaft the wheel 31 is fitted loose, and a ratchet-wheel, 32, which is fast upon the shaft 24, revolves in the bosom of the wheel 31, as will be more clearly seen in reference to Fig. 2, Drawing No. 3. Attached to the wheel 31 are four ratchets, 33, one of which is always sure, by weight and position, to fall into the ratchet-wheel 32. It is obvious, therefore, that while the ratchet-wheel moves in one direction it will carry with it in rotation the wheel 31; but when it moves in an opposite direction the ratchets will slip over the teeth and leave the wheel 32 stationary. The ratchet-teeth in this case are so set that while the regulating-wheel from which it is driven moves so as to carry the carriage in an outward direction; the wheel 31 is carried round, giving motion to the rollers; but while the regulating-wheel is moving in an opposite direction, during the inward progress of the carriage, the wheel 31, and consequently the rollers, remains stationary. Motion is communicated to the rollers from wheel 31 through the stud-wheels 34, the stud of which being movable in a slit concentric to the wheel 31, facility is given for shifting the wheels so as to admit of adjustment of draft or ratch of the carriage from the rollers.

For conveying motion to the spindles a large pulley or fly-wheel, 35, is made fast upon the driving-shaft 6. From this pulley a strap proceeds to a pulley, 36, fast upon the speed-shaft 37, and having a corresponding loose pulley, 38. The strap passes through a guide, 39, which serves to shift it over the pulleys when required, as shall hereinafter be described. On any convenient part of the speed-shaft 37 (in this case it is about the middle) there is placed a band-pulley, 39½, over which there passes a drum-band, 40, in the usual manner, which passes over the stud-pulley 41, and over the guide-pulleys 42, and thence to the drums 43. At one end of the shaft 37 a brake-pulley, 44, is made fast, upon which a brake, 45, is let down when the spindles are to be stopped. This brake is wrought by a lever, 46, which forces down the brake by the action of the spring 47, which comes in operation when the retaining-catch 48 is withdrawn, as shall hereinafter be described, and the brake-lever is instantly replaced upon the catch by the pressure of the cam 49, attached to the under socket of the swinging frame, and which passes upon the friction-pulley 50 (attached to the brake-lever) during its vibration toward the center of the regulating-wheel.

In order that the winding-on motion may be communicated to the speed-shaft, three or more ratchets, 51, are attached within the rim of the brake-pulley. While the speed-shaft is in rapid motion, these ratchets are thrown out by means of their centrifugal force until stopped by the rim of the brake-pulley, so that when the speed-shaft is giving twist to the rollers the ratchets move round without noise or wear; but the instant the motion is stopped the catch in the upper region falls into a ratchet-wheel, 52, which is attached to a spur-wheel, 53, fitted loose upon the speed-shaft 37, and which wheel derives its motion from the winding-on shaft 54. This shaft derives its motion from the roller-shaft 24 by means of the spur-wheel 55, which communicates its motion through the intermediate wheel 56 to the wheel 57 on the end of the winding-on shaft 54. This shaft rests in bearings in the frame-work of the head-stock, and the motion transmitted through it from the regulating-wheel to the spindles undergoes an adjusting modification by a peculiar mechanism, admitting of a differential movement, whereby motion, varying in any required degree, may be transmitted to the spindles, and through the same means any degree of strain or tension may be transmitted to the threads being wound on. A mechanism involving the principle of this differential movement was some years ago patented in England as applicable to the machine called the "Spindle and Fly Roving Frame;" but it has never before, to the best of my knowledge, been applied as a means of winding on in self-acting mules. The construction and operation of this mechanism I shall now describe.

Figure 3:
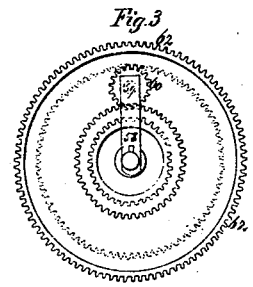
Figure 4:
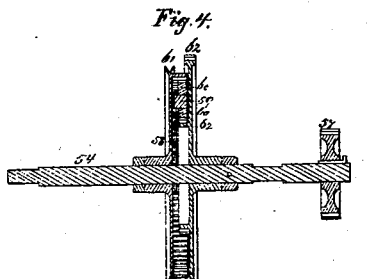
Figure 7:
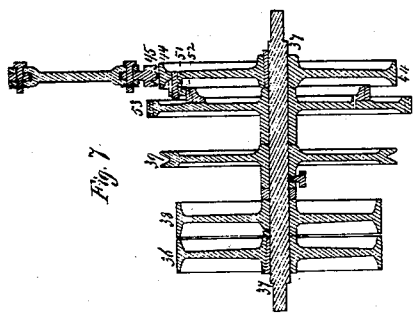
Figure 8:
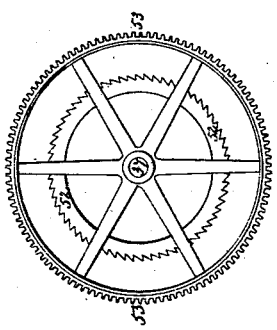
Figure 6:
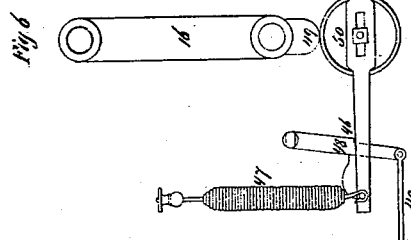

Proceeding from the body of the winding-on shaft 54 is an arm, 58, to which is fixed a strong stud, 59. A pinion, 60, is fitted to revolve upon this stud. This pinion on the one side gears into a series of inverted teeth extending round near the periphery of the friction-pulley 61, and colored pink, as clearly seen in Figs. 3 and 4, Drawing 3, and on the other side it gears into a series of external teeth in the wheel 62, which is colored blue. The pulley 61 and the wheel 62 are both of them fitted loose upon the shaft 54. When the shaft 54 and arm 58 move in rotation, the stud 59 carries with it the pinion 60, which, being in gear both with the pulley 61 and the wheel 62, has a tendency to carry them both in rotation with it; but it is evident that if either is held fast additional motion will be communicated to the other, and by the same law whatever part of the motion of the one is restrained will be imparted to the other. The surface of the cops upon which the threads have to be wound being of a conical form and a constantly-varying extent, it is necessary that the movement of the spindles be constantly varied to correspond with the extent of surface upon which the threads are for the instant being wound. From the wheel 62 the winding-on movement is conveyed to the spindles, while the pulley 61 is restrained in its movement by the friction of the band or strap passing round it, embracing it in its groove, which restraint, however, may be obtained in various ways, such as by brakes or frictions of various forms, or by a weight or weights, or by springs, or by any other restraining power applied directly to the axis of the pulley; but in this case a band made of cotton thread is found to be most convenient. The one end of this band is made fast to a stud, 63, projecting from the frame-work of the head-stock, and, passing round the pulley, as seen at 64, runs along to the opposite end of the head-stock, where it is attached to the cross-tail 65 of the lever 66. Upon the stem of this lever there is fitted a weight, 67, movable along the stem, and which can be made fast at any point by the pinching-screw 68. By adjustment of this weight on the lever 66 it is evident that the degree of tension communicated to the friction-band may be modified in any degree within the limits of the weight and leverage. Consequently any degree of restraint may be imparted to the pulley 61, and it is obvious that the exact amount of that restraint will be communicated both in movement and in tension to the threads being wound on the spindles. In looking at the varying leverage which the threads exert upon the spindles in consequence of the varying circumferences on which they are wound, it would seem that their power over the restraining influence of the friction-band would vary proportionally and cause a want of uniformity in their tension; but it so fortunately happens that in practice this is compensated by other counteracting laws. For instance, when the threads are exerting the greater leverage a small movement of the spindle is required. Consequently a lesser force is necessary to produce their movement, and as this diminished movement of the spindle throws a corresponding greater movement upon the friction-pulley, so the amount of its friction is increased, and what with the greater restraining power arising from this increased friction and the lesser power required to overcome the *vis inertia* and friction of the spindles, the additional leverage-power of the threads is in practice completely compensated for. The only juncture at which it is necessary to apply an additional restraining-power is when the threads are being wound upon the bare stems of the spindles at the beginning of a new set of cops and for a few stretches after the commencement, and at which juncture it is necessary to get up the spindles to an increased motion suddenly at the commencement of each winding on of the successive stretches of thread until the bottom of the cops has acquired some volume. For this purpose additional pressure is conveniently applied to the lever 47 through the connecting-rod 50, proceeding from the lever 51, and upon the lower surface of which lever an additional pressure is thrown by a simple apparatus connected with the building-bar, which shall hereinafter be described.

As mule-carriages are frequently of considerable length, as much sometimes as from fifty to sixty feet, and as the force necessary to move them is often applied at one end, although sometimes in the middle, it is necessary to have some means of securing the movement of both ends of the carriage simultaneously and together throughout their movements, and this is more especially necessary in self-acting mules. It is usual to effect this purpose by means of bands which are technically called "squaring-bands." These are made fast to studs fixed upon the floor at the four corners of the plane over which the carriage moves, and the respective bands pass between the two studs diagonally opposed to each other, the bands going over friction-pulleys at each end of the carriage. This mode of "squaring," as it is technically termed, suits very well for hand-mules, and with care can be made to operate sufficiently well in self-acting mules; but where so much accurate mechanism is applied as in a proper self-acting mule such mode of squaring is inconsistent with the general structure, and is not found in practice to be at all times sufficiently accurate and certain. Therefore, to render the movements of mule-carriages where my self-acting apparatus is applied more mechanical in its principle and more certain in its operation, I substitute for these bands a shaft or cylinder, which passes along under the whole length of the carriage, and having upon it at each end, and sometimes also, in long carriages, at the middle, toothed wheels, which work into toothed racks attached to the rail-rods or races upon which the carriage moves, as seen at 150, Drawing No. 2, by which means the parallel movement of the carriage is at all times perfectly insured.

In order that the shaft may be of light weight, and at the same time oppose a considerable resistance to torsion, I make it of tin-plate, or, what is preferable, of common sheet-iron, about the thickness of wire gauze No. 14, riveted together at the joinings, and in the form of a cylinder of from four to five inches in diameter, as seen at 151, Drawing No. 2, where it is necessary to have bearings or couplings. I introduce a stout connecting-shaft of good malleable iron, which is riveted into a long square socket of a cast-iron piece, which is made to fit into the interior of the iron cylinder, and having a flange, to which the sheet-iron is firmly riveted. When the carriage has arrived at the utmost limit of its stretch and the spindles have been stopped by the brake, as before explained, the pinion of the pinion-shaft 18 has arrived at that point of the regulating-wheel at the outer series where it turns into the radial series.

Before the faller, which guides the threads upon the spindles, is put down, it is necessary to remove the coils of thread from the stems of the spindles. This is usually done by moving the spindles backward a few turns. The method which I adopt is more simple. The under faller, which is usually placed along the back part of the carriage, I place in front of the building-faller shaft, and it stretches along the whole length of the carriage, as shown at 69–70 representing the shaft of the building-faller. While the carriage is coming out, the under faller is kept in such a position that its wire runs along under the threads about a quarter of an inch distant from them, and being at a sufficient distance from the points of the spindles to allow the wire of the building-faller to pass freely between it and the spindles. At that end of the under-faller shaft which is farthest from the head-stock there is attached a lever, 71, upon which is a sliding nut, 72, which is adjustable to any part of the lever by a screw, 73. To the lower part of this nut there is attached a hook, upon which hangs a spiral spring, 74, which is attached to the frame-work of the carriage below, and is adjustable to any degree of tension by a screw and nut where it passes through the fixture. This spring has a tendency to turn round the faller-shaft so as to bring up the faller-wire, but which is retained in its proper position by a supporting-lever, 75, as more clearly seen in Figs. 13 and 14, Drawing 3. A back lever, 76, springing from the shaft of the under faller, has an arc-head with an opening in it, through which a stud-bolt passes, and which can be made fast at any part of the arc. Upon this stud the socket of a movable rod, 77, is fitted, which rod runs down to an inclined plane attached to the head of the building-bar, which will be hereinafter described. On the rod at 78 there is an adjustable stud made fast by a pinching-screw, and which stud rests upon the top of the supporting-lever 75, which supporting-lever is movable upon a stud fast to the frame-work of the carriage. The under faller, being liberated, as shall be hereinafter described, rises up until the point of the rod 77 comes in contact with a stop. By this movement the coils are stripped from the spindles, and the threads are prepared to receive the wire of the building-faller. The spring 74 is so adjusted that it imparts a certain amount of tension to the threads and serves to correct any casual variation in the amount of winding-on force, and to throw the coils again on the spindles at the end of the stretch. At the outer end of the building guide-rod 70, at the end of the carriage next the head-stock, there is attached a toothed arc, 79, which gears into a rack, 80, which is fitted to work vertically upon studs made fast to the carriage end, and which rack by its movement causes the motion of the building-faller. To a projecting piece on the back of this rack is jointed the small folding arm, 81, which is jointed at its opposite end to the folding leg 82. This folding leg runs down and rests upon the surface of the builder or shaper, which shall hereinafter be described. At the back of the friction-pulley at the bottom of the folding leg there is a T-headed nut, which works in a vertical groove of a spur-piece, 83, made fast to the frame-work of the carriage end. This serves to guide the lower end of the folding leg in a direct vertical line while it is moved up and down by the action of the shaper.

Figures 12, 13, 14:
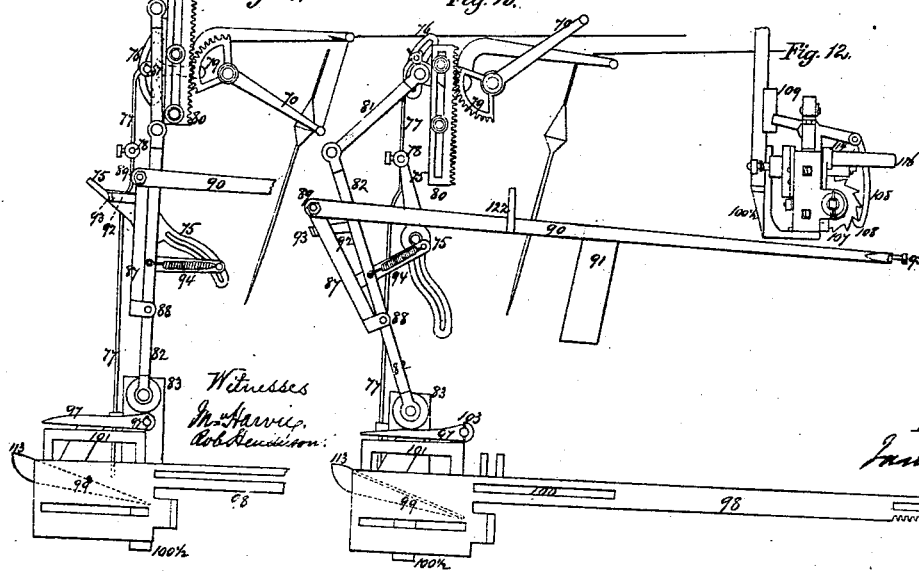

In Fig. 13, Drawing 3, the folding leg is shown in the position it occupies when the building-guide is up, while in Fig. 14 it is shown in its straight or vertical position, as when the guide-wire is pushed down to the bottom of the cop. In this position the middle joint is allowed to pass rather beyond the line of centers, so that it is locked and will retain its position against any pressure until pushed to the other side of the line of centers. In this position it is pressed on end by the strain of the threads on the faller-wire, and also by the action of the spring 84, which operates upon the axes of the shaft of the upper faller through the strap 85. This spring, it will be seen, is also adjustable to any degree of pressure at the nut 86. Attached to the falling leg there is a short arm, 87, which is attached to the leg by a joint at 88, and being connected by another joint at 89 to the end of the poker or sliding bar 90. The sliding bar rests upon a bearing at 91. A palm, 92, attached to the folding leg, prevents the arm 87 from falling back beyond a certain limit by a knob at 93. Another palm, 94, springing from the arm 87, passes on to the supporting-lever 75, and a stud from this palm works into the curved slit of the lever 75, and retains it in its position. The small spiral spring attached to the end of this palm and to a pin upon the folding leg serves to keep the arm 87 to its place at 93. It will be seen that as the lower end of the folding leg is raised or lowered, so the stud in the palm 94 approaches to or recedes from the center of the lever 75, when the sliding bar or poker is moved forward, as will hereinafter be described, it carries with it the top of the arm 87, which, moving forward the palm 94, turns the supporting-lever 75 upon its axis with more or less quickness, according to its distance from the center, by means of the stud projecting into its curved slit, and liberates the under faller at 78, which causes the wire of the under faller to strip the coils of thread from the spindles. The sliding bar, continuing its motion, brings the upper end of the arm 87 in contact with the folding leg 82 and forces the leg into a vertical position, thereby shoving up the rack 80 and putting down the building-faller, all as shown in Fig. 14, Drawing 3, in which positions the whole are retained while the folding leg remains in a vertical position, and which continues during the running in of the carriage. When the carriage has arrived nearly to its utmost limit at the beam, the adjustable screw 95 in the point of the poker 90 comes in contact with a bracket piece, 96, which is attached to the frame-work of the head-stock, and the carriage continuing its movement little farther, the poker, by means of the arm 87, draws the middle joint of the folding leg beyond the line of centers, when the pressure of the threads upon the faller-wire and the action of the spring 84 instantly causes the faller-wire to rise to its stationary position, leaving the threads to be lifted up by the under faller, to be coiled to the points of the spindles, while the supporting-lever 75 has resumed its position by the movement back of the arm 87, and is ready to receive the stud 78 when the under faller rises up to its stationary position. According as the building of the cops advances to the points of the spindles the point upon which the bottom of the folding leg rests is lowered, and consequently the point 89, at which the sliding bar is attached, and therefore the sliding bar working over the resting-point at 91 as a fulcrum, its point at 95 is raised, and in going up to the beam comes in contact progressively with different points of the restraining-bracket 96, so that by placing the vertical surface of this bracket in an oblique direction the period of liberating the building-faller can be regulated in any degree, and is so adjusted that the faller is liberated sooner when building at the bottom of the spindles than when near its points, and by this means the due tension of the threads is preserved at the lifting of the faller.

Figure 11:
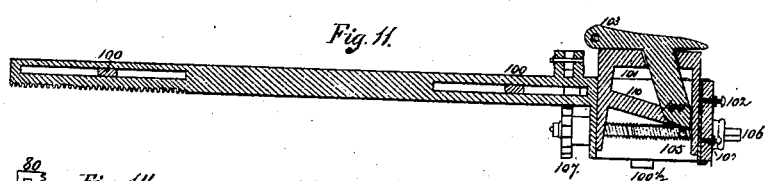

In order to regulate the building of the yarn on the cops, an apparatus is attached to that end of the carriage which is nearest the headstock, and upon which the end of the folding leg 82 rests at 97, having a friction-pulley to prevent wear. The building apparatus consists of a sliding bar, 98, having a head-piece, 99. This bar slides upon two studs, 100, and rests upon a stirrup-piece, 100½, hanging from the frame work of the carriage, and which supports the head-piece immediately under the pressure of the folding leg. At the one end of this bar there is a toothed rack, working into a pinion on the axis of the carriage-wheel, which wheel moves in unison with the carriage, as before described. The sliding bar 98 performs a traverse of six inches backward and forward at each draw. The lower end of the folding leg 82, resting upon the curved plane 97, which is attached to the sliding bar 98, moves along the surface of the curved plane during its traverse, and the curved plane is so adjusted that the requisite vertical movement is given to the folding leg and communicated through it to guide the wire of the building-faller, whereby the disposition of the successive layers of thread is duly regulated upon the cops. The head-piece 99 is cast hollow, having an opening or mortise in its body fitted to receive the building-frame 101, and which is well fitted in the head-piece to move vertically, and is adjustable by a brass and pinching-screw at 102, as more clearly shown in Fig. 11, Drawing 3.

In describing further this apparatus reference will be particularly directed to Figs. 10, 11, 12, 13, and 14, Drawing 3. In reference thereto it will be seen that the curved-surface piece upon which the folding leg 82 rests moves in the building-frame 101 on a joint at 103, and which curved piece has a tongue, 104, which passes down to a pin, 105, which pin is fitted to move in a horizontal slit in the head-piece 99. The pin projects from a nut through which passes a screw, 106, and which screw is held in bearings in the head piece 99. On the one end of the screw there is a ratchet-wheel, 107, which is moved a tooth at each traverse of the carriage by the pawl or ratchet 108, the movement of which is caused by an inclined plane, 109, attached to the carriage end, operating upon the end of the pawl-lever. As the screw is moved gradually round by each successive movement of the pawl, the nut-pin 105 moves along under the end of the tongue 104, while at the same time a diagonal bar, 110, in the building-frame 101 rests also upon the pin 105, and the lower surface of which is nearly a straight line. As the pin moves along under the surface, the building-frame 101 is allowed to drop with a gradual progress in proportion to the obliquity of the diagonal; but it will be seen that as the resting-surface of the tongue of the curved-surface piece forms an angle with the line of the plane of the diagonal, so will the tongue-piece be allowed to drop more than the building-frame as the nut passes along, and consequently the obliquity of the curved surface to the horizontal will be increased, thereby causing a greater vertical movement of the folding leg at each succeeding draw, which will have the effect of increasing the range of the faller-wire, and thereby give the body of the cops a longer form than they had at the bottom or beginning. When the pin has arrived at the point 111, it leaves the tongue-piece and proceeds along the surface of the diagonal, allowing the building-frame to drop with a regularly-progressive movement for the proper forming of the cops.

When a set of cops has been completed, the pin is wound back to its original position by a small winch, 112, applied to the square of the screw-shaft 106, at the opposite end to which the ratchet-wheel is attached. Affixed to the head-piece is an inclined plane, 113, (most clearly seen in Fig. 10, Drawing 3,) which serves to stop the movement of the stuffing by the under faller, in consequence of the rod 77 proceeding from the back lever of the under faller coming to rest upon it, and this inclined plane at the same time serves the purpose of securing the return of the under faller to its proper position as the carriage approaches the beam.

In order to give additional pressure at the beginning of the cop to the lever of the friction-band before alluded to, a lever, 114, as best seen in Drawing No. 1, is attached to the sliding bar, and having a joint at 115. At the opposite end there is a nose-piece with an oblique surface resting upon the nut-pin 105, and it will be seen that as the nut-pin moves forward the oblique nose-piece will allow the end of the lever 114 to drop. From this lever projects a pin, 116, (best seen in Fig. 12, Drawing 3,) which pin, when the carriage is at the head passing along the under surface of the lever 51 and through the rod connecting it with the lever 66, throws an additional tension upon the friction-band.

To the bottom of the swinging frame 16 there is attached with a joint at 117 a rod, 118, which passes along to the spinner-lever 119, and is attached to its inward end by a universal joint at 120. The spinner-lever moves on a stud or fulcrum fixed in a bracket, 121, attached to the frame-work. When the swinging frame performs its vibration toward the center of the regulating-wheel, it causes the outer end of the spinner-lever to move toward the carriage, which is then at its utmost outward limit. This end of the spinner-lever lays hold of a projecting piece of the poker or sliding bar at 122 and slides the bar home, thrusting up the folding leg, as elsewhere described. On the outer end of the driving-shaft 6 there is an endless screw, 123, which works into a screw-wheel, 124, upon the end of the upright cam-shaft 125, which cam-shaft serves to regulate the quantity of twist to be thrown into the threads after the carriage has reached its limit at the head, so that by increasing or diminishing the number of teeth in the screw-wheel 124 a greater or less quantity of twist is given at the head.

Figure 9:
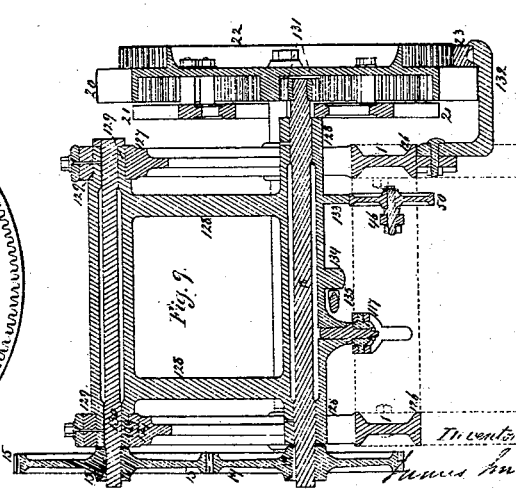

In order to give a more clear view of the swinging frame, with its various attachments, a vertical section is given in Fig. 9, Drawing 3, exhibiting also a vertical transverse section of the regulating-wheel; 21, the guard; 22, the large spur-wheel; 23, the carriage-rack, and supporting-bracket 132; 126, the run-rails of head-stock frame; 127, the upstarts supporting the swinging frame and shafts; 128, the swinging frame, having bearings in the upstarts at 129; 130, the axis of the stud wheel 15, gearing into the pinion-shaft wheel 19; 18, the pinion-shaft; 131, the pinion; 20, the regluating-wheel; 21, the guard; 22, the large spur-wheel; 23, the carriage-rack; 132, brackets supporting the rack bolted to the frame-rail; 50 the friction-wheel of the brake-lever; 46, the brake-lever; 133, a cam-piece projecting from the swinging frame which acts upon the brake-pulley 50; 134, a projecting piece which comes in contact with the belt-lever when the pinion-shaft is stopped; 135, transverse section of belt-lever, with stop; 117, the attachments of the rod which proceeds to the spinner-lever.

Having now described the various parts of the machine embodying my said invention, together with many well-known parts of mechanism common to all mules, I shall proceed to describe the progress of the successive movements during the completion of one stretch or draw.

The carriage being at the roller-beam, the regulating-wheel brings out the carriage with a slow and uniform motion, while the rollers move in exact unison, the speed-shaft being in full motion to give twist to the threads as the slubbing is given out by the rollers. When the carriage is about to arrive at its utmost limit, a finger-piece, 137, attached to the pulley-bearer of the carriage, comes in contact with the tail of the hanging lever 138, which by a wire, 139, is connected to a cross-tail, 140, on the bottom of the axis of the lever 13, which, causing the lever 13 to move upon its axis, throws the driving-belt of the pinion-shaft from the fast pulley 10 onto the loose pulley 12, whereby the movement of the regulating-wheel and all the movements depending upon it are stopped. When the quantity of the twist at the head, due to the size of the twist-wheel which may be at the time on the cam-shaft, has been given, the cam 141 will have arrived at the point of the lever 142, and, pushing it round upon its fulcrum 143, causes the opposite end at 144 to draw the wire 145, which, being attached to the guide-lever 39, shifts the belt from the fast pulley 36 of the speed-shaft 37 onto the loose pulley 38, and the cam 141 immediately proceeding to move the lever 146, which through the medium of the wire 147 draws off the brake-lever catch 48, when the brake immediately drops upon the brake-pulley and stops the movement of the speed shaft and spindles. At the same instant the cam 141 reaches the adjusting-point of the lever 13, and immediately so moves this lever as to throw the belt of the change-shaft again upon the fast pulley, which, putting the pinion-shaft in motion, the pinion traveling down in the radial series of teeth, causes the swinging frame to vibrate toward the center of the regulating-wheel when in its progress it passes over the friction-pulley of the brake-lever, relieving the brake, and at the same time moving the spinner-lever, which shoves forward the sliding bar, relieving in the first instance the under faller, which immediately rises and strips the coils from the spindles, and the continued motion of the spinner-lever and sliding bar pressing up the folding leg puts down the building guide-wire to its building position. When this movement is about to be completed, the pinion of the regulating-wheel has arrived at that point where the motion of the wheel begins to be reversed and the carriage begins gradually to move inward, at the same instant the winding-on motion begins to act, and the movements of the carriage and the winding on continue to operate in unison until the carriage has nearly reached its utmost limit inward. At this point the adjustable pin 95 of the poker comes in contact with the bracket-piece 96, and relieves the building-faller, as before described, while at the same instant a projecting finger, 148, attached to the upper bearer of the guide-pulley and the carriage, comes in contact at 149 with the cross-lever of the belt-guide 39, and throws the belt again on the fast pulley, when the machine is again in order to proceed with another stretch or draw.

It is well known to all persons acquainted with the working of mules that they are generally arranged in pairs, being placed right and left opposite to each other, so that the same individuals—as spinners or piecers—who attend to the one attend also to the other, and the opposite mules are placed at such distance from each other on the planes over which the carriages move that they shall never approach nearer to each other when both carriages are at their utmost outward limit than from twelve to eighteen inches, so that the persons attending them may have room to stand between the carriages, and in this way a pair of mules generally occupy in their breadth a space of from sixteen to eighteen feet; but in this my invention I under some circumstances so place the opposite mules that the carriage of the one shall pass over a part of the plane of the path of the other, whereby much room is saved, and, besides, the space which the attendants have to move over at each successive draw is considerably diminished, and they are always kept close up to their work. This I effect, in a very simple and obvious manner, by simply having the frame-work of the head-stock in one piece and by removing those parts of the apparatus which apply to the respective carriages to proper points beyond each other on the frame work of the head-stock, and by having them so arranged that in the crossing of the carriages none of the parts shall improperly interfere with the other; but it is obvious that when mules are adjusted to cross the paths of each other in this manner they must be set to keep such pace with each other as shall prevent the carriages from meeting on that part of the path which is common to both. This I accomplish either by placing a single driving-shaft in the middle of the connected head-stock, so that the movements are communicated from it to both mules, or when there is a separate driving-shaft to each mule, I pass a connecting shaft from the one to the other, driving each from it with bevel-gear, and having the first motion communicated to this shaft. The mules must of course be set to move relative to each other, so that the one shall be at the one limit of its path while the other is approaching its opposite limit. In this condensed mode a pair of mules occupies about fourteen and four-tenths feet, while a pair on the other plan occupies eighteen feet.

Having thus described the various mechanism of my said invention, together with the different modes of operation, I shall now proceed to enumerate those modes, parts, and arrangements contrived by me for rendering the mule-jenny self-acting and claimed by me; but previous to describing such claims I do hereby declare that I do not claim as of my invention any of the well-known parts or arrangements or modes of operation common to the ordinary mule-jenny, or which may have been used in any other attempts that have been made, whether successful or otherwise, to render the mule-jenny self-acting; but

I do claim—

1. Generally, the combination of all parts, arrangements, and modes of operation hereinbefore described which are hereinafter claimed as new and original, and which have not, to the best of my knowledge, been invented, publicly used, or exhibited by others.

2. The application of the mangle-wheel or regulating-wheel for producing and regulating the various movements which I have described as applicable to the self-acting mule.

3. As involved in my invention and right all modifications of the principle embodied in said regulating-wheel whereby a varied change of movements is acquired by a continuous series of tooth-work.

4. The mode of putting down and retaining in its position the building-faller by means of a folding leg or jointed bar, together with the building apparatus hereinbefore described as applicable to regulate the movements of the building-faller through the folding leg.

5. The mode of removing the coils from the spindle by means of the under faller-wire attached to arms proceeding from a shaft or faller-rod placed near to and parallel with the under faller rod or shaft, together with the modes of operating upon the same, as hereinbefore described.

6. The mode for regulating the tension of the threads when being wound upon the cops by a yielding and self-adjusting counterpoise, whether depending upon the resistance of a weight, spring, or friction, or from two or more of these combined, or from any other means affording a yielding and adjusting counterpoise to the strain of the threads, and whether by the interposition of a differential movement, as hereinbefore described, or by a direct application of such counterpoise.

7. The application to the self-acting mule of the differential principle or mode hereinbefore described as facilitating the application of such counterpoise and in modifying adjustably the direct motion and force in its transmission to the spindles during the process of winding on.

JAMES SMITH.

Witnesses:
  JN. HARVIE,
  ROB. HENDERSON.